(12) United States Patent
Kuesegen et al.

(10) Patent No.: US 6,318,888 B1
(45) Date of Patent: Nov. 20, 2001

(54) METHOD AND DEVICE FOR INTRODUCING SOUND WAVES INTO REACTORS

(75) Inventors: Rainer Kuesegen, Langenfeld; Ferdinand Fieg, Erkrath; Achim Bartsch, Hamburg, all of (DE)

(73) Assignee: Cognis Deutschland GmbH, Duesseldorf (DE)

(*) Notice: Subject to any disclaimer, the term of this patent is extended or adjusted under 35 U.S.C. 154(b) by 0 days.

(21) Appl. No.: 09/463,134

(22) PCT Filed: Jul. 13, 1998

(86) PCT No.: PCT/EP98/04330

§ 371 Date: Apr. 7, 2000

§ 102(e) Date: Apr. 7, 2000

(87) PCT Pub. No.: WO99/03575

PCT Pub. Date: Jan. 28, 1999

(30) Foreign Application Priority Data

Jul. 19, 1997 (DE) .............................................. 197 31 099

(51) Int. Cl.⁷ .................................................. B01F 11/00
(52) U.S. Cl. ............................................ 366/118; 366/275
(58) Field of Search ..................................... 366/108, 114, 366/113, 117, 118, 124, 127, 275, 332, 333

(56) References Cited

U.S. PATENT DOCUMENTS

| | | | | |
|---|---|---|---|---|
| 2,124,983 | * | 7/1938 | Martin | 366/275 |
| 2,499,203 | * | 2/1950 | Warren | 366/275 |
| 2,552,970 | * | 5/1951 | Horsley et al. | 366/118 |
| 2,693,944 | * | 11/1954 | Fowle | 366/118 |
| 2,702,692 | * | 2/1955 | Kessler | 366/113 |
| 3,313,240 | * | 4/1967 | Bentov | 366/275 |
| 3,517,674 | * | 6/1970 | Allen et al. | 366/108 |
| 3,567,185 | * | 3/1971 | Ross et al. | 366/118 |
| 3,588,054 | * | 6/1971 | Ljungberg | 366/275 |
| 4,793,714 | * | 12/1988 | Gruber | 366/275 |

FOREIGN PATENT DOCUMENTS

| | | | |
|---|---|---|---|
| 44 36 064 | | 4/1996 | (DE) . |
| 851 560 | * | 7/1949 | (DE) .................................. 366/124 |
| 0 013 640 | | 7/1980 | (EP) . |
| 1 418 488 | | 12/1975 | (GB) . |
| 1214553 | * | 2/1986 | (SU) .................................. 366/124 |
| WO93/10895 | | 6/1993 | (WO) . |

OTHER PUBLICATIONS

G. J. Jameson, Trans. Instn. Chem. Engnrs. 44, (1966) pp. T91–T969.

* cited by examiner

Primary Examiner—Tony G. Soohoo
(74) Attorney, Agent, or Firm—John E. Drach; Steven J. Trzaska

(57) ABSTRACT

An apparatus for introducing vibrations into a vessel having: (a) a vessel capable of receiving a fluid medium; (b) a flexible membrane located at a bottom end of the vessel; (c) an upper pressure chamber located adjacent to an outer surface of the flexible membrane; (d) a lower pressure chamber located below the upper pressure chamber; (e) a linkage member; (f) vibrating means connected to the linkage member; and (g) a rod member rigidly connected to both the linkage member and the flexible membrane for transmitting vibrations into the vessel, the rod member being axially located within both the upper and lower pressure chambers.

11 Claims, 2 Drawing Sheets

METHOD AND DEVICE FOR INTRODUCING SOUND WAVES INTO REACTORS

BACKGROUND OF THE INVENTION

This invention relates to a process for introducing mechanical vibrations into vessels through a flexible membrane installed in the vessel wall by means of a push rod and to an arrangement for introducing vibrations produced by a vibration generator into a vessel, the vibrations being designed to be delivered through a linkage as vibration pickup to a flexible membrane installed in the vessel wall.

In many chemical reactions between immiscible phases, it is important to obtain a good mass transfer between the phases. Thus, reactions between liquids and the gases dispersed therein take place at the phase interface. The overall reaction rate depends on the transfer of the gas into the liquid phase. In many cases, this transfer of the gas limits the reaction rate.

There are known processes which accelerate the transfer of a gas into a liquid and hence reduce energy costs or increase the specific volume yield or both. Thus, it has been proposed to increase the reaction rate in a process for hardening unsaturated fats by catalytic hydrogenation with hydrogen by exposing the reaction mixture to high-energy ultrasound. High increases in the reaction rate were measured but unfortunately cannot be attributed to an improvement in mass transport. Instead, detailed investigations have shown that they are based on an increase in the temperature of the reaction mixture through the effect of the high-energy ultrasound waves. Comparative measurements with and without exposure to high-energy ultrasound under isothermal conditions revealed no differences in the overall reaction rate.

Other disadvantages are an obstacle to the application of this proposal for industrial purposes. The acoustic power density used in this process amounts to more than 100 W/l reactor volume and is thus far too high for industrial purposes. Also, ultrasonic waves are very heavily attenuated in gas/liquid dispersions so that ultrasonication is uneconomical for relatively large reactors suitable for industrial purposes.

In an Article in Trans. Instn. Chem. Engnrs. 44 (1966) T91, G. J. Jameson reports on another process for increasing mass transfer in gas/liquid dispersions by sound waves. In this process, a gas/liquid column is made to resonate through low-frequency sound. This process is unsuitable for industrial purposes because very low frequencies would have to be used for relatively large vessels and hence tall liquid/gas columns. These frequencies would have to be below 10 Hz and would have to have amplitudes of more than 0.5 m in order significantly to improve mass transport.

DE 44 36 064 A1 describes a process in which the frequency of the sound acting on the gas/liquid column is substantially equal to one of the resonance frequencies of the phase interface between the gas bubbles and the liquid. The power density of the sound is below the levels sufficient for degassing the liquid. Under these conditions, mass transfer in the gas/liquid mixture is clearly improved and the overall reaction rate in a liquid/gas reaction is greatly increased.

In such a process, the sound waves can be introduced into a reactor or other vessel through the delivery of the vibrations produced by a vibration generator via a linkage to a flexible membrane. This membrane is installed in the wall of the reactor or vessel. However, this is only possible when substantially the same pressure prevails on both sides of the membrane. Accordingly, arrangements in which ambient pressure prevails in the vessel or reactor belong to the prior art. This technique cannot be applied when the difference in pressure between the two sides of the membrane is such that the membrane is significantly moved from its neutral or rest position. Thus, where a pressure of 20 bar prevails in the vessel, a compressive force of about 2 tonnes is applied, for example, to a relatively small membrane area of 100 $cm^2$.

BRIEF SUMMARY OF THE INVENTION

The technical problem addressed by the present invention was further to develop the process described at the beginning in such a way that it would be suitable for introducing sound into pressure vessels and pressure reactors. This problem is solved by carrying out the process for introducing mechanical vibrations in such a way that a pressure acting on the membrane and push rod on the vessel side is compensated through the arrangement of the membrane and push rod in chambers with pressures acting in opposite directions, the push rod transmitting the mechanical vibrations acting thereon without play, and by an arrangement in which the vessel is a pressure vessel and the outside of the membrane is arranged in a pressure chamber in which the same pressure as in the vessel prevails, the vibration pickup being connected to the membrane without play via a push rod.

Reactions between various substances and, in particular, the mass transfer between immiscible phases in pressure vessels can be favorably influenced in a simple, readily controllable manner by the process according to the invention. One particular advantage is that the force acting on the membrane and push rod through the pressure prevailing inside the vessel is made independent of the cross-sectional area of the membrane through the provision of the pressure chambers. The cross-sectional area of the sound-transmitting membrane can thus be varied relatively freely which is very useful where the process is applied on an industrial scale.

The push rod which is introduced into the pressure chamber from the surrounding atmosphere to transmit the vibrations transmitted to it by the vibration pickup to the membrane has to be pressure-tight. This can lead to attenuation and hence to impairment of its movability. This is avoided by an embodiment of the arrangement in which the push rod is mounted for pressure compensation at both ends in its direction of movement. This is achieved by providing a flexible seal connected to the push rod in the pressure chamber on the side opposite the membrane and a second flexible seal on the wall of a second pressure chamber at the other end of—and connected to—the push rod, both pressure chambers containing a fluid under substantially the same pressure as prevails in the vessel or reactor. If the two flexible seals have equally large pressure transmission surfaces with respect to the fluid, the end result is equally large compressive forces which act on the push rod from both sides and cancel out each other's effect.

If the vibration pickup is connected to the push rod outside and between the two pressure chambers, the linkage of the vibration pickup advantageously does not have to be guided into the pressure chambers and accordingly does not have to be pressure-insulated. The interconnection of the two pressure chambers by a fluid line ensures in a simple manner that the same fluid pressures prevail in both pressure chambers.

The design of the flexible seals as a cup or roll membrane advantageously provides for extremely flexible and effective sealing which does not interfere with the movability of the push rod. In addition, in an embodiment such as this, the problem of supporting the roll or cup membrane on the side remote from the pressure chamber can be favorably solved by means fixed to the push rod.

The fact that the membrane in the vessel or reactor wall consists of a flexible membrane material which is tightly clamped in the reactor wall at its outer edge and between two metal disks at its center creates particularly favorable conditions for connecting the push rod to the membrane via the metal disks.

Besides the advantages already mentioned, other advantages will become apparent from the following description of one example of embodiment with reference to the accompanying drawings, wherein:

DETAILED DESCRIPTION OF THE INVENTION

Figure 1:
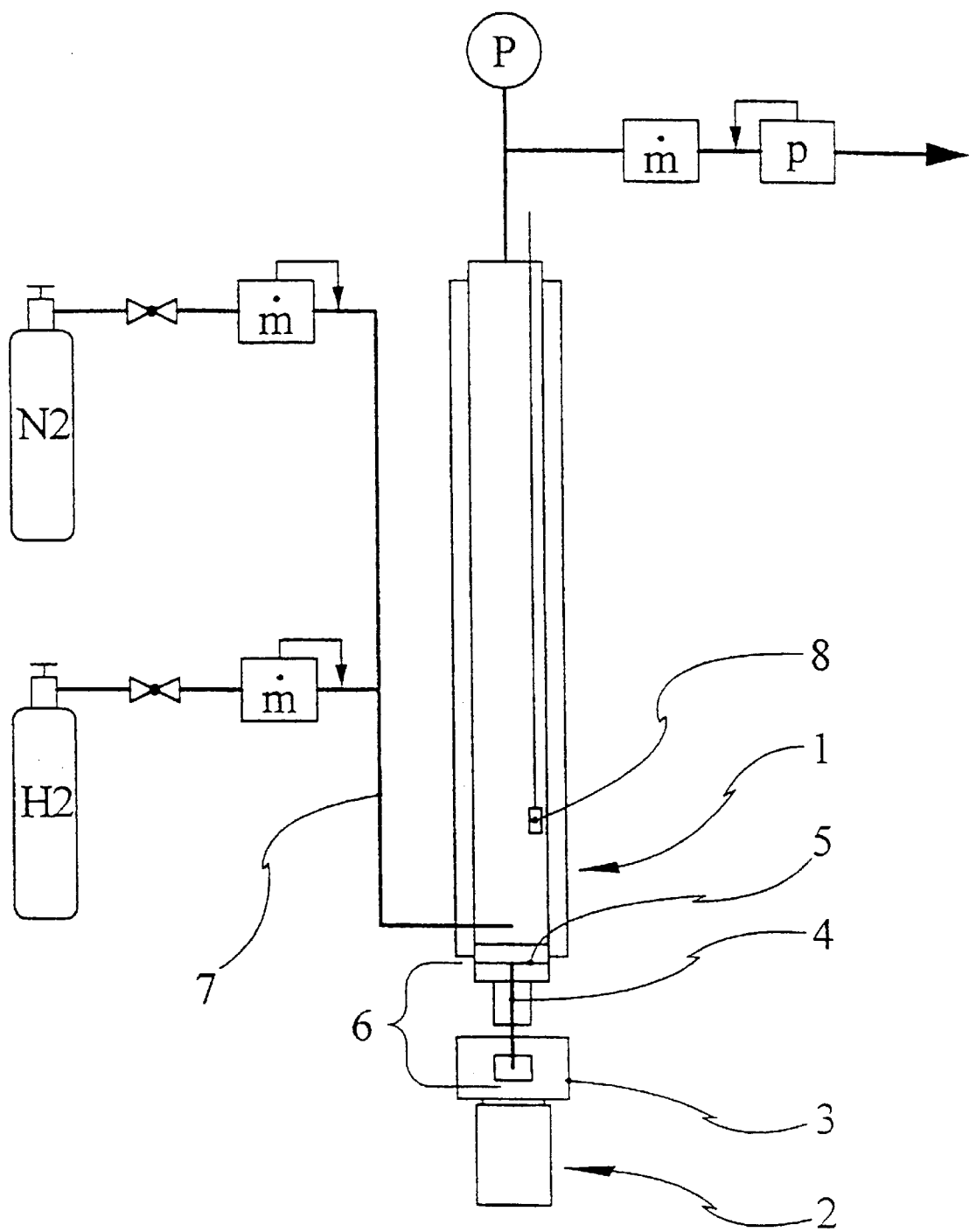
FIG. 1 schematically illustrates a liquid/gas pressure reactor with a vibration generator.

The pressure reactor for a gas/liquid column—for example a hydrogenation reactor for fats—schematized in FIG. 1 consists of the pressure reactor 1 into which gases under corresponding pressure are introduced through a line 7. A pressure transducer 8 is fitted inside the reactor to enable the pressures required for the hydrogenation process to be controlled and maintained. Installed in the bottom of the pressure reactor 1 is a membrane 5 which is connected without play to a push rod 4, that side of the membrane 5 remote from the reactor and the push rod 4 being arranged in a pressure compensator 6 which is only shown in highly schematic form and which will be described in more detail with reference to FIG. 2. Shown below the pressure reactor 1 is a vibration generator 2 designed to transmit the vibrations generated to the push rod 4 via a linkage 3 as vibration pickup and hence into the pressure reactor 1 via the membrane 5. The vibration generator 2 may be formed, for example, by a sound source similar to a large loudspeaker.

Figure 2:
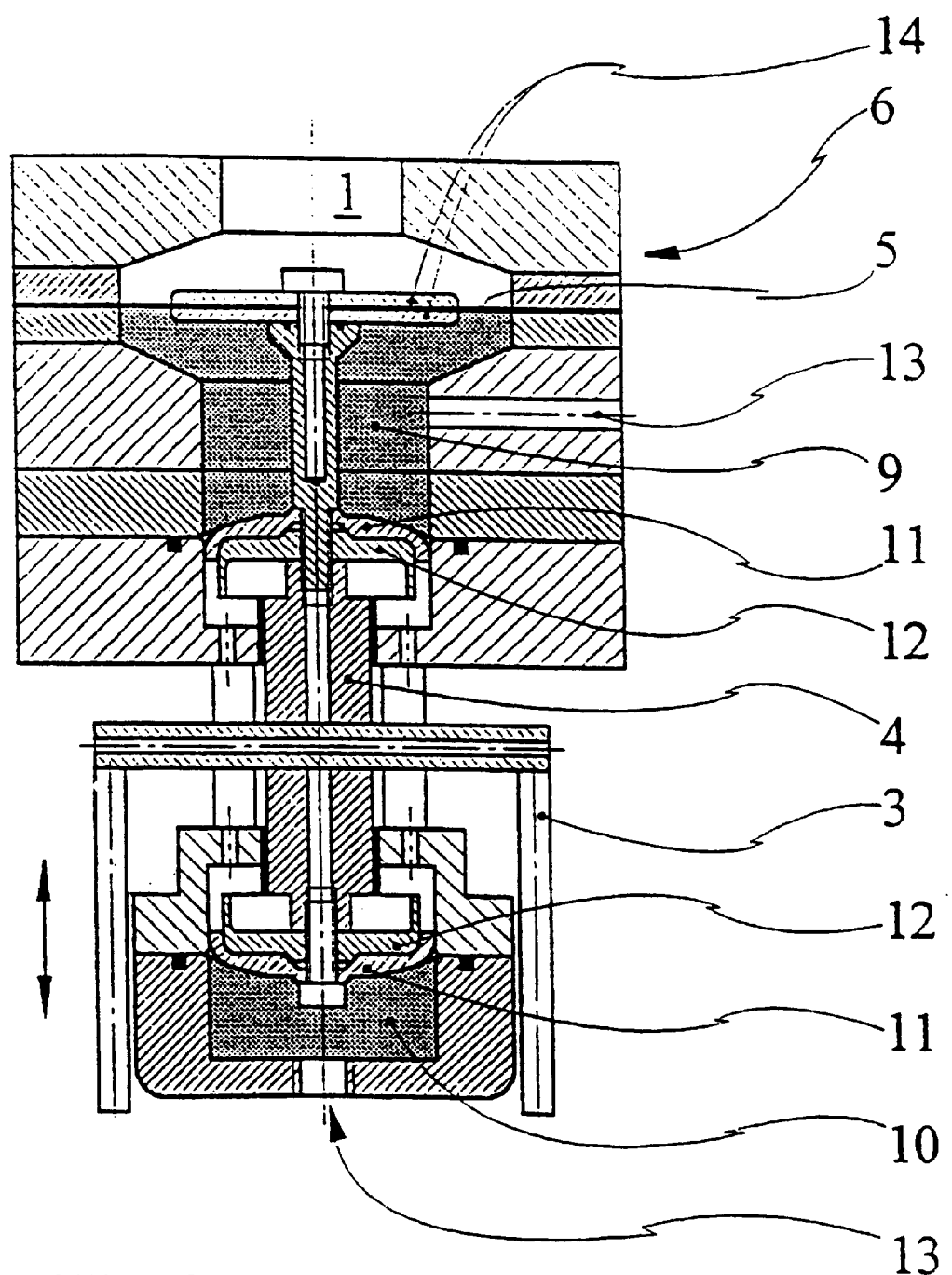
FIG. 2 shows an arrangement for the pressure-compensated introduction of vibrations into a pressure reactor.

The arrangement 6 for the pressure-compensated introduction of vibrations into the pressure reactor 1, which is only schematized in FIG. 1, is shown in detail in FIG. 2. The base of the pressure reactor 1 can be seen in the upper part of FIG. 2. The pressure reactor 1 is sealed tight by the membrane 5 in its base. Disposed on that side of the membrane 5 remote from the reactor is an upper pressure chamber 9 of which the upper part is similar in shape to the lower conically widening part of the pressure reactor 1. The lower part of the upper pressure chamber 9 is similar in its geometry to the lower pressure chamber 10 described hereinafter.

At its periphery and at its center, the membrane material of the membrane 5 is tightly clamped between two metal disks 14 which are centrally connected without play to the upper end of the push rod 4. On that side opposite the membrane 5, the upper pressure chamber 9 is closed by a flexible seal 11 which, in the embodiment illustrated, is in the form of a roll or cup membrane. A fixed support 12 bears against the back of the flexible seal 11. The seal 11 and the support 12 are connected to the push rod 4. The lower pressure chamber 10 is sealed in the same way as the upper pressure chamber 9. Pressure equalizing openings 13 designed to be connected by a pressure equalizing line (not shown) are present in both pressure chambers 9 and 10.

Between the two pressure chambers 9 and 10, the push rod 4 is connected in the ambient atmosphere to the linkage 3 which is connected as vibration pickup to the vibration generator 2. This ensures that even the slightest vibrations transmitted for example from a sound membrane to the vibration pickup linkage 3 are mechanically transmitted highly sensitively to the push rod 4. Energy in the form of oscillating vibrations can be transmitted substantially unattenuated by the push rod 4 which is mounted for pressure compensation at both ends and which is extended beyond the point where it is fixed to the upper cup membrane 11 and the support 12 towards the pressure reactor and is connected without play to the membrane 5 via the metal disks 14.

The construction of the arrangement 6 for the pressure-compensated introduction of vibrations into the pressure reactor 1 enables a very wide range of pressures and temperatures to be covered. The arrangement according to the invention has been successfully used in tests with a gas/liquid high-pressure reactor for the hydrogenation of fats at gas pressures of up to 20 bar and at temperatures of up to 200° C. However, providing suitable materials and a suitable pressure construction are used, the arrangement may also be used for vacuum reactors or quite generally with different vacuum and excess pressure limits. Hydrogen and nitrogen have been successfully tested as pressure fluids. In this respect, too, there are no limits to the use of other fluids for adaptation to the particular reaction.

What is claimed is:

1. An apparatus for introducing vibrations into a vessel comprising:
    (a) a vessel capable of receiving a fluid medium;
    (b) a flexible membrane located at a bottom end of the vessel;
    (c) an upper pressure chamber located adjacent to an outer surface of the flexible membrane;
    (d) a lower pressure chamber located below the upper pressure chamber;
    (e) a linkage member;
    (f) vibrating means connected to the linkage member; and
    (g) a rod member rigidly connected to both the linkage member and the flexible membrane for transmitting vibrations into the vessel, the rod member being axially located within both the upper and lower pressure chambers.

2. The apparatus of claim 1 wherein the flexible membrane is interposed between a pair of metal disks which serve to secure the flexible membrane to the bottom end of the vessel.

3. The apparatus of claim 1 further comprising a pair of flexible seal members attached to both ends of the rod member, the ends being located within both the upper and lower pressure chambers.

4. The apparatus of claim 1 wherein the flexible seal members have a surface area of sufficient size to withstand pressures equivalent to those present in the vessel.

5. The apparatus of claim 1 further comprising a fluid line connected to both the upper and lower pressure chambers for introducing a fluid medium into and out of the upper and lower pressure chambers.

6. A process for transmitting vibrations into a vessel comprising:

(a) providing a vessel capable of receiving a fluid medium;

(b) providing a flexible membrane located at a bottom end of the vessel;

(c) an upper pressure chamber located adjacent to an outer surface of the flexible membrane;

(d) providing a lower pressure chamber located below the upper pressure chamber;

(e) providing a linkage member;

(f) providing vibrating means connected to the linkage member;

(g) providing a rod member rigidly connected to both the linkage member and the flexible membrane for transmitting vibrations into the vessel, the rod member being axially located within both the upper and lower pressure chambers; and (h) engaging the vibrating means.

7. The process of claim 6 wherein the flexible membrane is interposed between a pair of metal disks which serve to secure the flexible membrane to the bottom end of the vessel.

8. The process of claim 6 further comprising a pair of flexible seal members attached to both ends of the rod member, the ends being located within both the upper and lower pressure chambers.

9. The process of claim 8 wherein the flexible seal members have a surface area of sufficient size to withstand pressures equivalent to those present in the vessel.

10. The process of claim 6 further comprising a fluid line connected to both the upper and lower pressure chambers for introducing a fluid medium into and out of the upper and lower pressure chambers.

11. The process of claim 6 wherein a pressure inside the vessel is equivalent to pressures found in both the upper and lower pressure chambers.

* * * * *